(12) United States Patent
Sun et al.

(10) Patent No.: US 11,084,024 B2
(45) Date of Patent: Aug. 10, 2021

(54) METHOD FOR MODIFYING MOLECULAR SIEVE AND A CATALYTIC CRACKING CATALYST CONTAINING THE MOLECULAR SIEVE

(71) Applicant: PetroChina Company Limited, Beijing (CN)

(72) Inventors: Shuhong Sun, Beijing (CN); Xiaoliang Huang, Beijing (CN); Haitao Zhang, Beijing (CN); Gengzhen Cao, Beijing (CN); Yunfeng Zheng, Beijing (CN); Lin Wang, Beijing (CN); Zhishuang Pan, Beijing (CN); Zhengguo Tan, Beijing (CN); Yahong Wang, Beijing (CN); Jinjun Cai, Beijing (CN); Hongchang Duan, Beijing (CN); Xueli Li, Beijing (CN); Chengyuan Yuan, Beijing (CN); Dong Wang, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 808 days.

(21) Appl. No.: 15/750,398

(22) PCT Filed: Aug. 4, 2016

(86) PCT No.: PCT/CN2016/093194
§ 371 (c)(1),
(2) Date: Feb. 5, 2018

(87) PCT Pub. No.: WO2017/020848
PCT Pub. Date: Feb. 9, 2017

(65) Prior Publication Data
US 2018/0229223 A1 Aug. 16, 2018

(30) Foreign Application Priority Data

Aug. 5, 2015 (CN) .................. 201510474678.8
Aug. 5, 2015 (CN) .................. 201510475247.3

(51) Int. Cl.
| | | |
|---|---|---|
| *B01J 29/40* | (2006.01) | |
| *B01J 29/06* | (2006.01) | |
| *B01J 21/04* | (2006.01) | |
| *B01J 21/08* | (2006.01) | |
| *B01J 21/12* | (2006.01) | |
| *B01J 21/16* | (2006.01) | |
| *B01J 29/00* | (2006.01) | |

(Continued)

(52) U.S. Cl.
CPC ............ *B01J 29/405* (2013.01); *B01J 21/04* (2013.01); *B01J 21/08* (2013.01); *B01J 21/12* (2013.01); *B01J 21/16* (2013.01); *B01J 29/005* (2013.01); *B01J 29/061* (2013.01); *B01J 29/088* (2013.01); *B01J 37/031* (2013.01); *B01J 37/08* (2013.01); *C10G 11/05* (2013.01); *C10G 11/18* (2013.01); *B01J 37/0009* (2013.01); *B01J 37/0236* (2013.01); *B01J 37/04* (2013.01); *B01J 2029/062* (2013.01); *B01J 2229/186* (2013.01); *C10G 2300/70* (2013.01)

(58) Field of Classification Search
CPC ...... B01J 29/005; B01J 29/061; B01J 29/088; B01J 29/405; B01J 21/04; B01J 21/08; B01J 21/12; B01J 21/16; B01J 37/0009; B01J 37/0236; B01J 37/04; B01J 37/08; B01J 2029/062; B01J 2229/186; C10G 11/05; C10G 11/18; C10G 2300/70
See application file for complete search history.

(56) References Cited

U.S. PATENT DOCUMENTS

| | | |
|---|---|---|
| 4,900,428 A | 2/1990 | Mester |
| 5,232,675 A | 8/1993 | Shu et al. |

(Continued)

FOREIGN PATENT DOCUMENTS

| | | |
|---|---|---|
| CN | 1220188 A | 6/1999 |
| CN | 1270852 A | 10/2000 |

(Continued)

OTHER PUBLICATIONS

Chinese Search Report for Chinese Application No. 2015104746788 "Method for modifying molecular sieve" dated Jun. 6, 2018.
Chinese Search Report for Chinese Application No. 2015104752473 "Catalyst containing modified molecular sieve and preparation method thereof" dated Jun. 6, 2018.
Written Opinion of the International Searching Authority for International Application No. PCT/CN2016/093194, "Molecular Sieve Modification Method and Catalytic Cracking Catalyst Containing Molecular Sieve", dated Feb. 11, 2016.

(Continued)

*Primary Examiner* — Brian A McCaig
(74) *Attorney, Agent, or Firm* — Hamilton, Brook, Smith & Reynolds, P.C.

(57) ABSTRACT

The invention relates to a molecular sieve modification method and a catalytic cracking catalyst containing a molecular sieve. The method comprises: mixing a solution containing an ion of a Group MB metal in the periodic table, an organic complexing agent, and/or a dispersant and a precipitation agent, and stirring the same to form a suspension containing a precipitant of a Group IIIB element; and mixing the resulting precipitant and a molecular sieve slurry, stirring the same to obtain a mixed slurry containing the precipitant of the Group MB element and a molecular sieve, and performing spray drying and optional calcination, to obtain a modified molecular sieve. The catalyst comprises, as calculated based on the catalyst mass being 100%, 10-55% of a modified molecular sieve (on a dry basis), 10-80% of clay (on a dry basis), 0-40% of an inorganic oxide (on an oxide basis), and 5-40% of a binding agent (on an oxide basis). The catalyst has good activity stability and heavy metal contamination resistance.

20 Claims, No Drawings

(51) Int. Cl.
   B01J 29/08   (2006.01)
   B01J 37/03   (2006.01)
   B01J 37/08   (2006.01)
   C10G 11/05   (2006.01)
   C10G 11/18   (2006.01)
   B01J 37/00   (2006.01)
   B01J 37/02   (2006.01)
   B01J 37/04   (2006.01)

(56)         References Cited

U.S. PATENT DOCUMENTS

2015/0080209 A1    3/2015   Gao et al.
2015/0298106 A1*  10/2015   Ahmed ................ C10G 47/20
                                              208/111.3
2018/0222756 A1    8/2018   Gao et al.

FOREIGN PATENT DOCUMENTS

| CN | 1317547 A | 10/2001 |
|---|---|---|
| CN | 1340597 A | 3/2002 |
| CN | 1353086 A | 6/2002 |
| CN | 1362367 A | 8/2002 |
| CN | 1436727 A | 8/2003 |
| CN | 1436728 A | 8/2003 |
| CN | 1436835 A | 8/2003 |
| CN | 1506443 A | 6/2004 |
| CN | 1958452 A | 5/2007 |
| CN | 101088613 A | 12/2007 |
| CN | 101385983 A | 3/2009 |
| CN | 101474573 A | 7/2009 |
| CN | 102019195 A | 4/2011 |
| CN | 103055916 A | 4/2013 |
| CN | 103058217 A | 4/2013 |
| CN | 106423252 A | 2/2017 |
| CN | 106423253 A | 2/2017 |
| EP | 0925831 B1 | 6/1999 |
| EP | 1797951 A1 | 6/2007 |

OTHER PUBLICATIONS

International Search Report for International Application No. PCT/CN2016/093194, "Molecular Sieve Modification Method and Catalytic Cracking Catalyst Containing Molecular Sieve", dated Nov. 2, 2016.

Office Action for U.S. Appl. No. 15/750,403, "Preparation Method for Modified Molecular Sieve and Modified Molecular Sieve-Containing Catalytic Cracking Catalyst" dated Dec. 16, 2020.

* cited by examiner

METHOD FOR MODIFYING MOLECULAR SIEVE AND A CATALYTIC CRACKING CATALYST CONTAINING THE MOLECULAR SIEVE

This application is the U.S. National Stage of International Application No. PCT/CN2016/093194, filed Aug. 4, 2016, which designates the U.S., published in Chinese, and claims priority under 35 U.S.C. 119 or 365(c) to Chinese Application No. 201510474678.8, filed Aug. 5, 2015 and Chinese Application No. 201510475247.3 filed Aug. 5, 2015. The entire teachings of the above applications are incorporated herein by reference.

TECHNICAL FIELD

The present invention relates to a preparation method of catalytic materials and a catalyst containing the catalytic materials, in particular to a catalytic cracking catalyst having good activity stability and heavy metal contamination resistance.

BACKGROUND

As the crude oil is becoming heavier and poorer, the efficient processing of heavy oil and blending residue become an urgent need for refining enterprises to increase their processing capacity and obtain higher profits. Catalytic cracking is the most important process for heavy oil processing, and it plays an important role in the heavy oil processing process in refinery and is the main source of profits for the refinery, owing to the significant advantages such as high conversion efficiency of heavy oil, high quality of products and non-hydrogen and low operating pressure. According to statistics, currently there are around 420 sets of catalytic cracking units in the world. The scale of a single set of catalytic cracking unit is up to 10 million tons/year with a total processing capacity of about 737 million tons, ranking the first place in the secondary processing.

Because the heavy oil and residue contain macromolecular compounds that tends to produce coke, such as resins and asphaltenes, and contain heavy metals such as nickel and vanadium, a nickel-vanadium content of 10000 m/g on the catalytic cracking equilibrium catalyst is very common, and a heavy contamination up to 15000 m/g is not rare. Vanadium seriously damages the structure of the active component molecular sieve of the catalyst in the high temperature and hydrothermal environment of the catalytic cracking, which decreases the catalytic activity and worsens the distribution of the catalytic cracking products. Therefore, there is a need to develop a molecular sieve catalyst with excellent activity, hydrothermal stability and heavy metal contamination resistance to satisfy the stringent requirements of catalyst performance for heavy oil and residue cracking.

In order to improve the activity and the stability of the catalyst, rare earths or phosphorus are generally used to modify the molecular sieve in the prior art. For example, China Patent CN1169717C discloses a method for modifying zeolite Y with rare earth ions and products thereof. The method uses NaY molecular sieve as the raw material, which is firstly subjected to ammonium exchange followed by hydrothermal treatment, treated with a solution containing $H^+$, $NH_4^+$ and $RE^{3+}$, and then subjected to washing, drying and calcination to obtain the modified molecular sieve product. China Patent CN1111136C discloses a preparation method of a Y-type molecular sieve containing phosphorus and rare earth, obtained by firstly exchanging NaY molecular sieve with rare earth ions and ammonium ions, calcining, and then reacting with phosphorous compound to incorporate 1 to 10 wt % of $P_2O_5$, followed by calcining. China Patent CN1209288 C discloses a preparation method of a faujasite zeolite containing phosphorus and rare earths, obtained by firstly exchanging the faujasite zeolite with ammonium compound and phosphorus compound, and then introducing a rare earth solution to the exchange slurry for further reaction, followed by filtering, washing, and then calcining. The zeolite-containing catalyst has good activity stability, high gasoline yield, low coke yield, high heavy oil cracking capacity and heavy metal contamination resistance. China Patent CN1026225 C discloses a preparation method of a rare earth Y molecular sieve, obtained by ion exchanging NaY molecular sieve with rare earth ions in an aqueous solution, followed by filtering, and calcining the cake in flowing steam. China Patent CN1069553 C discloses a method for preparing a rare earth Y-type molecular sieve, obtained by ion exchanging NaY molecular sieve with rare earth ions, filtering, calcining the cake, circulating 1 to 40% of the calcined product back to the next batch of rare earth exchange slurry to continue the above-described operation with the rest used as a REY molecular sieve product for the preparation of a catalyst, which are continuously carried out. China Patent CN103058217 A discloses a method for preparing a rare earth-containing Y molecular sieve by firstly subjecting NaY molecular sieve used as a raw material to ammonium exchange, and then hydrothermal treatment, treating with a mixed solution containing $H^+$, $NH_4^+$, $RE^{3+}$ and an organic solvent, separating the mother liquor, and calcining the filter cake to obtain a modified molecular sieve product. China Patent CN1159101 C discloses a method for preparing a rare earth-containing ultrastable Y zeolite, comprising mixing the ultrastable Y zeolite having a sodium oxide content of 3-5 wt % with a rare earth compound solution to obtain a slurry, grinding the slurry under shear stress of at least 10 kg/cm² for at least 1 minute to obtain a modified molecular sieve product. The zeolite prepared by the method has high hydrothermal stability, and sodium and heavy metal contamination resistance.

CN99105792.9 discloses a rare earth-containing molecular sieve and a preparation method thereof, comprising: mixing a rare earth molecular sieve containing 0.1-40 wt % of rare earths in terms of oxide with a solution of at least one substance of (I) and at least one substance of (II) at 25 to 120° C. for at least 0.1 hour; wherein (I) comprises an inorganic acid, an inorganic base, an organic acid or a reagent capable of forming a complex with aluminum, and (II) comprises a soluble ammonium salt, an organic acid salt and amine, alcohol, aldehyde and ketone; the pH value of the solution is 3 to 12. In the method, the molecular sieve is firstly loaded with the rare earth and then treated with the at least one substance of (I) and the at least one substance of (II), in order to obtain a framework of rare earth molecular sieve, in which the rare earth is present in the framework of the molecular sieve, replacing a part of the cations on the molecular sieve framework.

CN200510114495.1 discloses a method for increasing the rare earth content of an ultrastable Y-type zeolite. The method comprises: sufficiently mixing the ultrastable Y-type zeolite and an acid solution having a concentration of 0.01-2N at a liquid-solid ratio of 4-20 in a temperature range of 20-100° C., treating for 10 to 300 minutes, washing, filtering, adding rare earth salt solution for rare earth ion exchange, followed by washing, filtering and drying to obtain the rare earth ultrastable Y zeolite with through cells and significantly increased rare earth content. The method firstly cleans the cell of Y zeolite with acid solution, and after filtration, the zeolite molecular sieve is exchanged with rare earth. The purpose of the method is to increase the rare earth content in the molecular sieve, in which the rare earth is present in the framework of the molecular sieve, replacing a part of the cations on the molecular sieve framework.

China Patent CN02103909.7 discloses a method for preparing a novel rare earth ultrastable Y molecular sieve containing vanadium-resistant component for catalytic cracking of heavy oil, wherein NaY-type molecular sieve is used as a raw material, and the chemical dealumination complexing agent contains oxalic acid or oxalate and mixture thereof, and at the same time, rare earth ions are introduced into the late stage of chemical dealumination reaction to form a rare earth precipitate, which is then subjected to a hydrothermal treatment to achieve the purpose of ultrastabilization and introduction of rare earth ions and independent phases of rare earth oxides. The method comprises: firstly treating the molecular sieve with the chemical dealumination complexing agent (oxalic acid and/or oxalate) to dealuminate the molecular sieve, and then forming a rare earth precipitate containing rare earth oxalate by using rare earth and a complexing agent. In the method, the chemical dealumination complexing agent (oxalic acid and/or oxalate) is capable of complexing with the aluminum in the molecular sieve but not with rare earths, and the particles of the rare earth precipitate formed by the method are large and the distribution in the molecular sieve is not uniform enough, therefore the heavy metal resistant effect is relatively poor.

CN200610087535.2 discloses a method for preparing a REY molecular sieve, comprising contacting the NaY molecular sieve with an aqueous solution containing rare earth ions for exchange, contacting with an additional precipitating agent to precipitate a part of the rare earths on the molecular sieve, followed by hydrothermal treatment and finally contacting with an aqueous ammonium salt solution, wherein the precipitating agent is a soluble carbonate aqueous solution or an alkaline aqueous solution. The essence of the preparation method is to remove the $Na^+$ content in the NaY molecular sieve and simultaneously introduce the rare earth ions through rare earth exchange and ammonium salt exchange; and the preparation comprises: firstly subjecting the molecular sieve to rare earth exchange, and then precipitating a part of rare earths on the molecular sieve with an additional precipitating agent, filtering the molecular sieve, washing, and subjecting the filter cake to hydrothermal treatment, and ammonium exchange. In the preparation process, the rare earths are mainly loaded onto the molecular sieves in the form of ion exchange, and some rare earths that have not been exchanged on the molecular sieves are precipitated with the precipitating agent. The rare earth-containing Y-type molecular sieve prepared by this precipitation method forms rare earth precipitates and contain independent phases of rare earths, but the particles of the rare earth precipitates are large, which is not favorable for uniform dispersion on the molecular sieve surface, and not favorable for effective contact with heavy metals, timely capture of heavy metals, so its heavy metal contamination resistance is insufficient. Meanwhile, since its raw material is NaY, the filtration, washing, hydrothermal treatment, and ammonium exchange for sodium reduction after rare earth exchange will also cause the rare earth utilization rate to be greatly reduced.

In the process of catalytic cracking, the heavy metals such as nickel and vanadium in the raw oil are continuously deposited on the catalyst. Vanadium deposited on the catalyst forms vanadic acid in the environment of oxygen, high temperature and moisture in the regenerator, to destroy the structure of the active component, molecular sieve in the catalyst, resulting in the collapse of the crystal structure of the molecular sieve and the deactivation of the molecular sieve. The heavy metal, nickel deposited on the catalyst will participate in the reaction process as a dehydrogenation active center, thereby deteriorating the selectivity of the catalytic cracking reaction and generating more coke and dry gas. Therefore, it is necessary to timely capture and deactivate nickel and vanadium to convert them into stable and inert compounds, so as to improve the heavy metal contamination resistance of the molecular sieve. It has been found that the rare earth ions are subjected to ion exchange with the cation such as sodium of the molecular sieve, migrate into the molecular sieve and serves to improve the activity and the stability of the molecular sieve. However, once the ion exchanged rare earth comes into contact with vanadium, it tends to separate from the framework structure of the molecular sieve to form rare earth vanadate, deteriorating the structural stability of the molecular sieve instead. However, due to the difference in the existing positions and existing conditions, the rare earths existing in the form of independent phases can be used to capture heavy metals during the catalytic cracking reactions, and play a role of resistance to heavy metals. Therefore, the aforementioned rare earth molecular sieves prepared by rare earth ion exchange do not contain independent phases of rare earth, so its ability to resist heavy metal contamination is not enough.

The rare earth-containing Y-type molecular sieve prepared by the precipitation method, even though the rare earth precipitates are formed and the independent phases of rare earth are contained, has large particles of the rare earth precipitate, which is not favorable for the uniform dispersion on the surface of the molecular sieve and is not favorable for effective contact with the heavy metals and timely capture of heavy metals. Therefore, in order to satisfy the requirements of molecular sieve or catalysts for activity stability and heavy metal contamination resistance, despite recent molecular sieves or catalysts and their preparation techniques, there is still a need for catalysts with excellent activity stability and heavy metal contamination resistance and new techniques for their preparation.

SUMMARY

One of the objects of the present invention is to provide a method for modifying a molecular sieve, the molecular sieve prepared by the method has excellent activity stability and heavy metal contamination resistance.

Another object of the present invention is to provide a modified molecular sieve prepared by the modifying method.

Another object of the present invention is to provide the catalytic cracking catalyst containing the modified molecular sieve prepared by the method. The prepared molecular sieve has excellent activity stability and heavy metal contamination resistance property, so that the catalytic cracking catalyst has good heavy metal contamination resistance property and good activity and stability.

A method for modifying a molecular sieve disclosed in the present invention comprises a method of modifying the molecular sieve comprising the following steps: mixing and stirring a solution containing the metal ions of Group IIIB of the periodic table with an organic complexing agent and/or a dispersant and a precipitating agent to form a suspension containing a precipitate of Group IIIB element; and mixing the suspension containing a precipitate of Group IIIB element with a molecular sieve slurry to obtain a mixed slurry containing a precipitate of Group IIIB element and a molecular sieve, followed by spray-drying and optionally calcining, to obtain a molecular sieve modified with the Group IIIB element;

Wherein the weight ratio of the Group IIIB element in terms of the oxides to the molecular sieve on dry basis is from 0.3 to 10:100, the molar ratio of the organic complexing agent to the metal ions of Group IIIB is from 0.3 to 10:1, the molar ratio of dispersant to metal ions is from 0.2 to 16:1.

The method for modifying the molecular sieve disclosed in the present invention comprises: mixing and stirring a solution of metal ions of the Group IIIB of the periodic table with an organic complexing agent, and/or a dispersant and a precipitating agent for at least 10 minutes to form a suspension containing a precipitate of Group IIIB element; and mixing and stirring the suspension of a precipitate of Group IIIB element with a molecular sieve slurry (preferably, the molecular sieve slurry is a sodium-reduced molecular sieve slurry) at a temperature of 5-100° C., preferably 5 to 60° C., more preferably 5 to 40° C. for at least 10 minutes, preferably 10 to 40 minutes to obtain a mixed slurry containing a precipitate of Group IIIB element and a molecular sieve, optionally filtrated, followed by drying, optionally calcining, to obtain a molecular sieve modified with Group IIIB elements. Wherein the weight ratio of Group IIIB elements in term of the oxide to the molecular sieve on dry basis is 0.3 to 10:100, preferably 0.3 to 8:100, and the molar ratio of the organic complexing agent to the metal ions of Group IIIB is 0.3 to 10:1, preferably 0.5 to 6:1, more preferably 1.0 to 4:1, the molar ratio of dispersant to the metal ions of Group IIIB is from 0.2 to 16:1, preferably 1 to 11:1, more preferably 2 to 7:1.

The solution containing the metal ions of Group IIIB of the periodic table of the present invention can be formed by dissolving a compound containing Group IIIB element of the periodic table in water or an acid.

According to a method for modifying the molecular sieve disclosed by the present invention, wherein the IIIB element is selected from one or more of scandium, yttrium, and lanthanide rare earth elements. The lanthanide rare earths include one or more of lanthanum, cerium, praseodymium, neodymium, promethium, samarium, europium, gadolinium, terbium, dysprosium, holmium, erbium, thulium, ytterbium, and lutetium. For example, it may be a mixture of various rare earth elements, or a single rare earth with high purity, generally lanthanum-rich rare earth, cerium-rich rare earth, pure lanthanum or pure cerium. The IIIB element-containing compound is selected from one or more of halides, nitrates, sulphates, oxides, and hydroxides of Group IIIB elements that are soluble in water or acids. The weight ratio of the precipitates of Group IIIB element in terms of oxides to the molecular sieve on dry basis is 0.3-10:100.

According to a method for modifying the molecular sieve disclosed by the present invention, the precipitating agent is a substance capable of chemically reacting with the Group IIIB metal ion in the system and making the product thereof slightly soluble or insoluble in the system, in a chemical precipitation reaction. Therefore, the kind and addition amount of the precipitating agent are well known to those skilled in the art, and one or more of the compounds that are capable of providing or generating hydroxide ions (OH), carbonate ions ($CO_3^{2-}$), bicarbonate ions ($HCO_3^-$), phosphate ions ($PO_4^{3-}$), hydrogen phosphate ions ($HPO_4^{2-}$), dihydrogen phosphate ions ($H_2PO_4$) and oxalate ions ($C_2O_4^{2-}$) can be used as the precipitating agent in the present invention, as long as the addition amount can satisfy the molar ratio of the substances in the precipitation reaction.

According to a method for modifying the molecular sieve disclosed by the present invention, the precipitating agent is preferably one or more of oxalic acid, ammonium oxalate, ammonium carbonate, ammonium bicarbonate, carbon dioxide, aqueous ammonia, phosphoric acid, diammonium hydrogen phosphate, ammonium dihydrogen phosphate, ammonium phosphate and urea. The amount of ammonia added depends on the pH value of the molecular sieve slurry, so that the pH value of the molecular sieve slurry maintained within the range of 6.5 to 9.0; the addition amount of oxalic acid, ammonium oxalate, ammonium carbonate, ammonium bicarbonate, carbon dioxide, phosphoric acid, diammonium hydrogen phosphate, ammonium dihydrogen phosphate, ammonium phosphate and urea is dependent on the addition amount of Group IIIB element compounds, so that the weight ratio of the above precipitating agent to the IIIB element compounds (in terms of oxides) is 0.3 to 5:1.

According to a method for modifying the molecular sieve disclosed by the present invention, the organic complexing agent is selected from one or more of formic acid, acetic acid, adipic acid, citric acid, tartaric acid, benzoic acid, ethylenediamine tetraacetic acid, salicylic acid and salts of the above acids, and acetylacetone, diethanolamine, triethanolamine, preferably one or more of citric acid, ammonium citrate, ammonium dihydrogen citrate, diammonium hydrogen citrate, EDTA (ethylenediamine tetraacetic acid). The molar ratio of the organic complexing agent to metal ions of Group IIIB is 0.3 to 10:1.

According to a method for modifying the molecular sieve disclosed by the present invention, the dispersant is well known to those skilled in the art, and is a surfactant having both lipophilic and hydrophilic properties in the molecule, which can uniformly disperse solid particles that are insoluble in the liquid while preventing the sedimentation and agglomeration of the solid particles, and form stabilizing the suspension, and the dispersant does not react with the metal ions of Group IIIB and form a precipitate. The main function of the dispersant is to reduce the interfacial tension between the liquid-liquid and the solid-liquid. The surfactants can also act as dispersants. Preferably, the dispersant is selected from one or more of monohydric or dihydric alcohols having 2 to 8 carbon atoms, polyethylene glycol, cellulose derivatives, polyacrylamide and derivatives thereof, and guar gum. The molar ratio of the dispersant to the metal ions of Group IIIB is 0.2 to 16:1.

According to a method for modifying the molecular sieve disclosed by the present invention, the cellulose derivative is typically one or more of carboxymethylcellulose sodium, methyl hydroxyethyl cellulose, and hydroxy propyl methyl cellulose.

According to a method for modifying the molecular sieve disclosed by the present invention, the monohydric or dihydric alcohol having 2 to 8 carbon atoms is well known to those skilled in the art of chemistry. For example, the monohydric or polyhydric alcohol having 2 carbon atoms is ethanol, or ethylene glycol, the monohydric or dihydric alcohol having 3 carbon atoms is isopropanol, n-propanol, 1,3-dipropanol, or 1,2-dipropanol. In the present invention, the monohydric or dihydric alcohol having 2 to 5 carbon atoms is preferable, and one or more of ethanol, ethylene glycol, isopropanol, butanol and methylpentanol are more preferable.

According to a method for modifying the molecular sieve disclosed by the present invention, the molecular sieve is preferably a sodium-reduced molecular sieve, that is, a molecular sieve having a low sodium content, preferably $Na_2O$ mass content not more than 2%. The techniques for reducing the sodium oxide content of the molecular sieves are well known to those skilled in the art, typically sodium reduction by ammonium ion exchange. The ammonium salt is selected from one or more of ammonium sulfate, ammonium bisulfate, ammonium nitrate, ammonium chloride, ammonium carbonate, and ammonium bicarbonate. The ammonium salt is mainly used to exchange sodium on the molecular sieve, so that the exchanged molecular sieve has an acid catalytic activity. The molecular sieve is selected from one or more of Y-type molecular sieve, β-molecular sieve, SAPO molecular sieve, ZSM molecular sieve and titania-silica molecular sieve; wherein the Y-type molecular sieve is selected from USY, REUSY, REHY, HY, $NH_4Y$, REY, and phosphorus-containing Y molecular sieves.

According to a method for modifying the molecular sieve disclosed by the present invention, the addition sequences and the addition number times of each of the solution containing the metal ions of Group IIIB of the periodic table, the organic complexing agent and/or the dispersant, the precipitating agent are not particularly limited during the mixing process of the solution containing the metal ions of Group IIIB of the periodic table and the organic complexing agent and/or the dispersant, the precipitating agent. The addition can be achieved by the following embodiments:

Method 1: Uniformly mixing the solution containing the metal ions of Group IIIB of the periodic table with the organic complexing agent and/or the dispersant, followed by adding the precipitating agent and stirring for at least 10 minutes to form a precipitate containing Group IIIB element;

Method 2: Uniformly mixing the precipitating agent with the organic complexing agent and/or the dispersant, followed by adding the compound solution containing the metal ions of Group IIIB of the periodic table and stirring for at least 10 minutes to form a precipitate containing Group IIIB element;

Method 3: Mixing the precipitating agent with the compound solution containing the metal ions of Group IIIB of the periodic table, followed by adding the organic complexing agent and/or the dispersant and stirring for at least 10 minutes to form a precipitate containing Group IIIB element.

Method 4: Adding and mixing the solution containing the metal ions of Group IIIB of the periodic table and the organic complexing agent and/or the dispersant, the precipitating agent simultaneously, and stirring for at least 10 minutes to form a precipitate containing Group IIIB element. Among these precipitates formed by these methods, the precipitates formed by Method 1 and Method 2 have the smallest particle size, and Method 1 and Method 2 are the optimal methods. The organic complexing agent and/or the dispersant play a role of dispersion and mainly reduce the particle size of the precipitate of Group IIIB element of the periodic table; the precipitating agent is mainly used to precipitate Group IIIB element of the periodic table. The organic complexing agent, the precipitating agent can be used directly, or used after being dissolved in water to form a solution.

According to a method for modifying the molecular sieve disclosed by the present invention, the obtained mixed slurry containing the precipitate of Group IIIB element of the periodic table and the molecular sieve is spray-dried. The mixed slurry can be filtered or not before spray-drying. After drying and optionally calcining, a Group IIIB element-modified molecular sieve is obtained.

According to a method for modifying the molecular sieve disclosed by the present invention, the mixed slurry containing the precipitate of Group IIIB element and the molecular sieve is optionally filtered, spray-dried, and optionally calcined, and a Group IIIB element-modified molecular sieve is obtained. The spray-drying is a common technique in the preparation of catalysts. After the spray-drying, a calcination is preferable. During the calcination, a high temperature treatment is performed on the precipitate of Group IIIB element of the periodic table, the minority of Group IIIB elements are ion exchanged with cations such as sodium on the molecular sieve, and migrate by exchange to the molecular sieve, which can make the molecular sieve charge balance and improve the molecular sieve activity and stabilize the crystal structure of the molecular sieve. The remaining majority of Group IIIB elements exist as an independent phase (such as rare earth oxide, rare-earth phosphonate, and the like) and plays a role of resisting heavy metal contamination. The purpose of adjusting the distribution state of Group IIIB element in the molecular sieve is achieved by controlling kinds and proportions of the compounds of Group IIIB element of the periodic table in the molecular sieve solid-liquid mixed slurry, and controlling the addition amount of the precipitating agent, the organic complexing agent and/or the dispersant. The proportions of Group IIIB element existing in the form of ions and those existing in the form of independent phase can be adjusted according to the actual needs of the molecular sieve activity, stability and heavy metal contamination resistance. The calcination process is performed under the condition of 10% to 100% steam atmosphere, the calcination temperature of 450-700° C. for a calcination time of 0.5-4 hours. During the calcination, there are dealumination and silicon migration, so that the Si—O—Al on the molecular sieve framework is replaced by Si—O—Si. Since Si atoms (0.082 nm in diameter) are smaller than Al atoms (0.1 nm in diameter), the bond length becomes shorter (Si—O bond length of 0.161 nm, Al—O bond length of 0.174 nm), the unit cell shrinks, and the structure stability of the molecular sieve is improved. The calcination process is also accompanied by ion migration, wherein the ions of Group IIIB element migrate to the sites of S I and S II in the sodalite cage of Y-type molecular sieve to stabilize the crystal structure of the molecular sieve and provide the acid active center. The $Na^+$ ions in the sodalite cage migrate to the supercages, and escape from the molecular sieve in the subsequent ion exchange. As compared with a pure high-temperature calcination, the hydrothermal calcination in an atmosphere of 100% steam is more favorable for the migration of ions of Group IIIB elements and $Na^+$ ions, and more favorable for maintaining the crystal structure and unit cell shrinkage of the molecular sieve.

According to a method for modifying the molecular sieve disclosed by the present invention, the content of Group IIIB element of the periodic table (in terms of oxide) in the molecular sieve is 0.5 to 20 wt %.

According to a method for modifying the molecular sieve disclosed by the present invention, by selecting the organic complexing agent and/or the dispersant, a suitable reaction environment is provided for the deposition of Group IIIB element on the molecular sieve, which facilitates the formation of ultrafine particle of Group IIIB element of the periodic table, the reduction of the particle size of the precipitate of Group IIIB element, and the increased outer surface and dispersion degree of the precipitate, and more uniform deposition of the Group IIIB element of the periodic table on the molecular sieve. The Group IIIB element of the periodic table exists in the independent phase or in a mixed form of independent phase/exchange ions state, that is the Group IIIB elements exists outside the framework structure or inside the framework structure of the molecular sieve in the independent phase or in a mixed form of independent phase/exchange ions state. The molecular sieve prepared by the present invention is more favorable for the timely and effective contact between the contaminating heavy metal and the contaminating heavy metal passivating agent (the precipitate of Group IIIB elements) and avoids the uneven distribution of the catalyst microsphere passivating agent, and avoids local absence of passivating agent on the microspheres or molecular sieve, so as to achieve the purpose of capturing heavy metals more effectively. Meanwhile when a catalyst is prepared by using the modified molecular sieve prepared by the method for modifying the present invention, it will have excellent activity and stability.

The present invention also provides a modified molecular sieve prepared according to the aforementioned method of the present invention.

The present invention also provides the catalytic cracking catalyst containing the modified molecular sieve, which contains a catalytically effective amount of the modified molecular sieve prepared according to the aforementioned modified method. The "catalytically effective amount" as used herein means the amount by which the modified molecular sieve plays a substantial role in the catalyst.

The present invention also provides a catalytic cracking catalyst containing the modified molecular sieve, wherein it contains 10 to 55% on dry basis of the modified molecular sieve prepared according to the aforementioned method of the present invention, 10 to 80% on dry basis of clay, 0 to 40% of an inorganic oxide in terms of oxide and 5 to 40% of binders in terms of oxide, based on 100% the mass of the catalyst.

Preferably, according to the catalytic cracking catalyst containing the modified molecular sieve disclosed by the present invention, the catalyst contains 15 to 45% on dry basis of a modified molecular sieve, 20 to 65% on dry basis of clay, 5 to 25% on dry basis of inorganic oxide in terms of oxide and 5 to 30% on dry basis of binders in terms of oxide, based on 100% mass of the catalyst.

According to the catalytic cracking catalyst containing the modified molecular sieve disclosed by the present invention, in the preparation method of the modified molecular sieve, when a mixed slurry containing a precipitate of Group IIIB of the periodic table and a molecular sieve is obtained, it can be used for the preparation of a catalytic cracking catalyst as obtained without any treatment. The slurry can also be treated, such that the mixed slurry containing a precipitate of Group IIIB of the periodic table and a molecular sieve is dried with or without calcination. The drying is a common technique in the art, for example, it may be filtered-dried or spray-dried.

According to the catalytic cracking catalyst containing the modified molecular sieve disclosed by the present invention, in the preparation method of the modified molecular sieve, the content of Group IIIB element of the periodic table (in terms of oxide) in the molecular sieve is 0.5 to 20 wt %.

According to the catalytic cracking catalyst containing the modified molecular sieve disclosed in the present invention, the inorganic oxide is not used as a binder, for example, the inorganic oxide is used in the form of a solid fine powder for the process of gelling the catalyst and maintains the solid state during the gelling process; the inorganic oxide is one or more of alumina, silica, titania, zirconia, or a mixture thereof. The alumina is selected from the various forms of alumina and/or hydrated alumina such as one or more of γ-alumina, η-alumina, θ-alumina, Boehmite, Gibbsite, and Bayreite, except the pseudo-boehmite which is acid soluble and has a binder effect when soluble in acid.

According to the catalytic cracking catalyst containing the modified molecular sieve disclosed in the present invention, the binder is selected from one or more of binders commonly used in cracking catalysts, such as one or more of silica sol, aluminum sol, modified silica sol, modified aluminum sol, amorphous silica-aluminum gel, and pseudo-boehmite, preferably pseudo-boehmite and/or aluminum sol.

The catalytic cracking catalyst containing the modified molecular sieve disclosed by the present invention can be performed according to the preparation method of the existing cracking catalyst. These methods are detailed described in CN02155601.6, CN00105235.7, CN200910092838.7, CN201110419922.2, CN02103907.0, all of which are incorporated herein by reference. The preparation method of the catalytic cracking catalyst containing the modified molecular sieve provided by the present invention comprises: mixing and slurrying the modified molecular sieve, the clay, the inorganic oxide and the binder, and spray-drying to prepare the catalyst. The various components of the catalytic cracking catalyst may be mixed and slurried in a variety of ways; each component may separately form a material slurry and then be mixed and slurried; or 2 to 3 kinds of components may be mixed and then be slurried, then the remaining materials are prepared into 2 or 1 material slurry, mixed and slurried, prepared into a mixed slurry containing a plurality of components.

The preparation method of the catalytic cracking catalyst containing the modified molecular sieve disclosed in the present invention, comprising:
(1) preparing the modified molecular sieve prepared according to the aforementioned method of the present invention; preferably, the slurry of the molecular sieve in the method being a slurry of sodium-reduced molecular sieve;
(2) Mixing and slurrying the modified molecular sieve obtained in step (1), the clay, the inorganic oxide and the binder and spray-drying to prepare a catalyst.

The preparation method of the catalytic cracking catalyst containing the modified molecular sieve disclosed by the present invention may also have the following alternatives. The preparation method comprises:
(1) preparing a mixed slurry containing a precipitate of Group IIIB element and a molecular sieve is prepared according to the aforementioned method; preferably, the mixed slurry containing the precipitate of Group IIIB element and the molecular sieve is a slurry of sodium-reduced molecular sieve;
(2) Mixing and slurrying the mixed slurry containing the precipitates of Group IIIB element and the molecular sieve obtained in the step (1), the clay, the inorganic oxide and the binder, and spray-drying to prepare the catalyst.

The preparation method of the catalytic cracking catalyst containing the modified molecular sieve disclosed in the present invention may further comprise the steps of calcining, washing, filtering and drying after spray-drying. The spray-drying, calcining, washing, filtering and drying pertain to the prior art, which are not particularly limited in the present invention.

The catalyst disclosed by the present invention is suitable for heavy oil catalytic cracking, and is particularly suitable for heavy oil catalytic cracking with high content of heavy metal vanadium. For example, the heavy oil is one or more of atmospheric residue, vacuum residue, vacuum gas oil, atmospheric gas oil, deasphalted oil and coker gas oil.

According to the catalytic cracking catalyst containing the modified molecular sieve disclosed by the present invention, in the preparation method of the modified molecular sieve, by selecting the organic complexing agent and/or the dispersant, a suitable reaction environment is provided for the deposition of Group IIIB element on the molecular sieve, which facilitates the formation of ultrafine particle of Group IIIB element of the periodic table, the reduction of the particle size of the precipitate of Group IIIB element, and the increased outer surface and dispersion degree of the precipitate, and more uniform deposition of the Group IIIB element of the periodic table on the molecular sieve. The Group IIIB element of the periodic table exists in the independent phase or in a mixed form of independent phase/exchange ions state, that is the Group IIIB elements exists outside the framework structure or inside the framework structure of the molecular sieve in the independent phase or in a mixed form of independent phase/exchange ions state. The catalyst prepared by the present invention is more favorable for the timely and effective contact between the contaminating heavy metal and the contaminating heavy metal passivating agent (the precipitate of Group IIIB elements) and avoids the uneven distribution of the catalyst microsphere passivating agent, and avoids local absence of passivating agent on the microspheres or molecular sieve, so as to achieve the purpose of capturing heavy metals more effectively. Meanwhile, the catalyst prepared by prepared by the present invention not only has an excellent property for anti-heavy metal contamination, but also has an excellent activity and stability.

DETAILED DESCRIPTION

The present invention is further illustrated as below by the Examples, but the present invention is not limited to these examples.

(A) The analytical test method used in Examples 1. sodium oxide, yttrium oxide, and rare earth content: using X ray fluorescence analysis.
2. crystallinity, and unit cell constant of the molecular sieve: using X-ray diffraction analysis.
3. particle size: using laser particle size analyzer method.
4. catalyst activity determination: performed on CSA-B-type catalyst evaluation device produced by Huayang company. The catalyst was preliminarily aged at 800° C. under 100% of steam for 6 h or 17 h, and the activity of the catalyst was measured using Dagang light diesel oil as a raw material at a reaction temperature of 460° C., a reaction time of 70 s, a catalyst loading of 5.0 g and a ratio of oil to solvent of 3.2:1.

(B) Specifications of raw material used in the Examples

1. NaY molecular sieve, REUSY molecular sieve ($RE_2O_3$ content: 4.02%, $Na_2O$ content: 1.24%), $NH_4Y$ molecular sieve ($Na_2O$ content: 1.68%, subjected to hydrothermal calcination once), ZSM-5 molecular sieve ($Na_2O$ content: 0.10%), kaolin (ignition loss: 18.6%) or kaolin (ignition loss: 14.6%), diatomaceous earth (ignition loss: 15.4%), aluminum sol (containing 21.2 wt % of alumina) or aluminum sol (containing 19.4 wt % of alumina), pseudo-boehmite (ignition loss: 31.8%), boehmite (ignition loss: 17.0%), silica (white carbon black, ignition loss: 9.91%), ammonia (concentration: 18%), rare earth nitrate ($RE_2O_3$ 230.5 g/L): all of which are industrial products, from Lanzhou Petrochemical Company catalyst plant.

2. Ammonium sulfate, citric acid, ammonium citrate, ethylene glycol, ethanol, methyl hydroxyethyl cellulose, ammonium oxalate, ethylenediamine tetraacetic acid, urea, diammonium hydrogen phosphate, lanthanum nitrate, cerium nitrate, yttrium nitrate: all of which are chemical reagents.

3. Hydrochloric acid: concentration of 36%, chemical reagent.

4. Synthesized yttrium-containing Y-type molecular sieve slurry Y-1: the molecular sieve slurry was prepared by the following process: (1) adding 1000 g of NaY molecular sieve (on dry basis) to 7 L of deionized water, adding thereto 350 g of ammonium sulfate while stirring, adjusting the pH value of the slurry to 3.4 with hydrochloric acid, and stirring the mixture at a temperature of 85° C. for 1 hour, followed by filtering and washing to obtain a filter cake; mixing the filter cake (798 g on dry basis) with 102 g of yttrium nitrate and 2.2 L of deionized water, stirring for 0.5 h, spray-drying, and hydrothermally calcining in a calciner in an atmosphere of 100% steam at a calcination temperature of 600° C. for a calcination time of 2 hours; (2) mixing the molecular sieve obtained in the step (1), ammonium sulfate and water in a weight ratio of molecular sieve (on dry basis):ammonium salt:water=1:0.3:5 to form a slurry; stirring at 75° C. and pH=3.5 for 1 hour to obtain the synthesized yttrium-containing Y-type molecular sieve slurry Y-1.

Example 1

2 g of citric acid, 2.48 mL of rare earth nitrate and 75 mL of deionized water were mixed to form a homogeneous solution, then 2 g of ammonium oxalate was added and stirred for 15 minutes to form a rare earth-containing precipitate slurry CD-1.

Example 2

2 g of ethanol, 2.48 mL of rare earth nitrate and 75 mL of deionized water were mixed to form a homogeneous solution, then 2 g of ammonium oxalate was added and stirred for 15 minutes to form a rare earth-containing precipitate slurry CD-2.

Comparative Example 1

2.48 mL of rare earth nitrate and 75 mL of deionized water were mixed to form a homogeneous solution, then 2 g of ammonium oxalate was added and stirred for 15 minutes to form a rare earth-containing precipitate slurry DCD-1.

The particle sizes were tested for the rare earth precipitates in the rare earth-containing precipitate slurries CD-1, CD-2, DCD-1 prepared by Examples 1, 2 and Comparative Example 1, respectively. The results are shown in Table 1:

TABLE 1

The particle sizes of the rare earth precipitates

| Items | particle size, % | | |
|---|---|---|---|
| | D(V, 0.1), μm | D(V, 0.5), μm | D(V, 0.9), μm |
| the rare earth-containing precipitate CD-1 prepared in Example 1 | 1.17 | 6.78 | 15.13 |
| the rare earth-containing precipitate CD-2 prepared in Example 2 | 1.16 | 9.08 | 20.53 |
| the rare earth-containing precipitate DCD-1 prepared in Comparative Example 1 | 1.18 | 12.24 | 27.37 |

The results in Table 1 show that in comparison with the rare earth-containing precipitate DCD-1 prepared by Comparative Example 1, the rare earth-containing precipitates CD-1 and CD-2 prepared by Examples 1 and 2 have a smaller particle size, indicating that the organic complexing agent and dispersant of the present invention can effectively reduce the particle size of the precipitates formed in the reaction of the rare earth with the precipitating agent.

Example 3

(1) 16 g of citric acid, 4 g of ethylene glycol, 54 g of yttrium nitrate and 1 L of deionized water were mixed to form a homogeneous solution, then 100 g of ammonium oxalate was added and stirred for 15 minutes to form a yttrium-containing precipitate slurry.

(2) The precipitate slurry formed in step (1) was added to the prepared yttrium-containing Y-type molecular sieve slurry Y-1, and stirred at a temperature of 55° C. for 10 minutes. The resultant was filtered, washed with water, and the filter cake was calcined at 600° C. under 100% steam atmosphere for 2 hours to obtain the modified molecular sieve Z-1.

600 g (on dry basis) of the molecular sieve Z-1 were added to 1.2 L of deionized water, and to a molecular sieve slurry Z-1J was obtained after sand milling. 619 g of aluminum sol (containing 19.4 wt % of alumina), 1499 g of kaolin (ignition loss: 14.6%), 2.2 L of water were mixed and slurried, and then added to the molecular sieve slurry Z-1J, and the stirring was continued for 30 minutes. After homogenization, spray-drying and molding, calcining, washing with water and drying were carried out to obtain the catalyst C-1 of the present invention.

Example 4

(1) 782 g (on dry basis) of REUSY molecular sieve, 16 g (on dry basis) of ZSM-5 molecular sieve and water were mixed according to the weight ratio of the molecular sieve (on dry basis): water=1:3 to form a molecular sieve slurry.

(2) 110 g of ethylenediamine tetraacetic acid, and 104 mL of rare earth nitrate were added into 0.8 L of deionized water to form a solution, the pH value of the mixed slurry was adjusted with ammonia to 7.5-8.0, 23 g of ethanol was added and the mixture was stirred at room temperature (25° C.) for 30 minutes to form a rare earth-containing precipitate slurry.

(3) The precipitate slurry formed in step (2) was added to the molecular sieve slurry obtained in step (1), and stirred at room temperature (25° C.) for 15 minutes. The resultant was filtered, washed, and the filter cake was dried at 200° C. to obtain the modified molecular sieve Z-2.

600 g (on dry basis) of the molecular sieve Z-2 was added to 1.2 L of deionized water, and a molecular sieve slurry Z-2J was obtained after sand milling. 619 g of aluminum sol (containing 19.4 wt % of alumina), 1513 g of diatomaceous earth, and 2.2 L of water were mixed and slurried, and then added to the molecular sieve slurry Z-2J, and the stirring was continued for 30 minutes. After homogenization, spray-drying and molding, calcining, washing with water and drying were carried out to obtain the catalyst C-2 of the present invention.

Example 5

(1) 798 g (on dry basis) of REUSY molecular sieve and water were mixed according to the weight ratio of the molecular sieve (on dry basis): water=1:3 to form a molecular sieve slurry.

(2) 155 g of urea, and 85 g of lanthanum nitrate were added into 0.8 L of deionized water and stirred, the pH value of the molecular sieve slurry was adjusted with ammonia to 6.5-7.0, 14 g of ethylene glycol was added therein and the mixture was stirred at room temperature (25° C.) for 1.5 hours to form a rare earth-containing precipitate slurry.

(3) The precipitate slurry formed in step (2) was added to the molecular sieve slurry obtained in step (1), and stirred at room temperature (25° C.) for 15 minutes. The mixed slurry was dried at 250° C. to obtain the modified molecular sieve Z-3.

600 g (on dry basis) of molecular sieve Z-3 were added to 1.2 L of deionized water, and the molecular sieve slurry Z-3J was obtained after sand milling. 1054 g of kaolin (ignition loss: 14.6%), 587 g of pseudo-boehmite, and 2.2 L of water were mixed and slurried. 60 mL of hydrochloric acid was added therein and stirred for 1 hour. The molecular sieve slurry Z-3J was added and stirred for 15 minutes. Then 515 g of aluminum sol (containing 19.4 wt % of alumina) was added, and the stirring was continued for 30 minutes to form a gel. After homogenization, spray-drying and molding, calcining, washing with water and drying were carried out to obtain the catalyst C-3 of the present invention.

Example 6

(1) 798 g (on dry basis) of $NH_4Y$ molecular sieve and water were mixed according to the weight ratio of the molecular sieve (on dry basis): water=1:5 to form a slurry.

(2) 40 g of ammonium citrate, and 277 mL of rare earth nitrate were added to 0.6 L of deionized water, the pH value of the molecular sieve slurry was adjusted with ammonia to 8.0-9.0, and the stirring was continued at a temperature of 35° C. for 30 minutes to form a rare earth-containing precipitate slurry.

(3) The precipitate slurry formed in step (2) was added to the molecular sieve slurry obtained in step (1), and stirred at 35° C. for another 40 minutes to obtain the modified molecular sieve Z-4 slurry. The modified molecular sieve Z-4 slurry was spray-dried to obtain the modified molecular sieve Z-4.

1030 g of kaolin (ignition loss: 14.6%), 440 g of pseudo-boehmite, 120 g of boehmite, and 2.2 L of water were mixed and slurried, 33 mL of hydrochloric acid was added therein and stirred for 1 hour, and then 600 g (on dry basis) of the modified molecular sieve Z-4 slurry was added and stirred for 15 minutes. Then 619 g of aluminum sol (containing 19.4 wt % of alumina) was added and the stirring was continued for 30 minutes to form a gel. After homogenization, spray-drying and molding, calcining, washing with water and drying were carried out to obtain the catalyst C-4 of the present invention.

Example 7

(1) 798 g (on dry basis) of NH$_4$Y molecular sieve and water were mixed according to the weight ratio of the molecular sieve (on dry basis): water=1:3.5 to form a slurry.

(2) 70 g of diammonium phosphate, 64 g of cerium nitrate were added to 0.4 L of deionized water, and stirred at a temperature of 15° C. for 10 minutes, and then 30 g of ethylene glycol, 15 g of ethanol were added and stirred for 20 minutes to form a rare earth-containing precipitate slurry.

(3) The precipitate slurry formed in step (2) was mixed with the molecular sieve slurry obtained in step (1) and stirred at 15° C. for 25 minutes, the obtained molecular sieve after spray-dried was hydrothermally calcined in a calcination furnace under 100% steam atmosphere at a temperature of 550° C. and a calcination time of 2.5 hours to obtain the modified molecular sieve Z-5.

600 g (on dry basis) of molecular sieve Z-5 was added to 1.2 L of deionized water, after sanding treatment to obtain the molecular sieve slurry Z-5J. 738 g of kaolin (ignition loss: 14.6%), 220 g of pseudo-boehmite, and 1.5 L of water were mixed and slurried. 19 mL of hydrochloric acid was added and stirred for 1 hour. Then the molecular sieve slurry Z-5J was added and stirred for 25 minutes, then 619 g of aluminum sol (containing 19.4 wt % of alumina) was added and the stirring was continued for 30 minutes to form a gel. After homogenization, spray-drying and molding, calcining, washing with water and drying were carried out to obtain the catalyst C-5 of the present invention.

Example 8

(1) 798 g (on dry basis) of NH$_4$Y molecular sieve and water were mixed according to the weight ratio of the molecular sieve (on dry basis): water=1:5 to form a slurry.

(2) 69.2 mL of rare earth nitrate, 16 g of citric acid, and 3 g methyl hydroxyethyl cellulose were added into 0.7 L of deionized water and stirred at a temperature of 25° C. for 15 minutes, and then 64 g of ammonium oxalate was added and the stirring was continued for 15 minutes to form a rare earth-containing precipitate slurry.

(3) The precipitate slurry formed in step (2) was mixed with the molecular sieve slurry obtained in step (1) and stirred for 15 minutes, the obtained molecular sieve was hydrothermally calcined in a calcination furnace under 100% steam atmosphere at a temperature of 650° C. for a calcination time of 2 hours to obtain the modified molecular sieve Z-6.

500 g (on dry basis) of molecular sieve Z-6 was added to 1.0 L of deionized water, and the molecular sieve slurry Z-6J was obtained after sand milling. 867 g of kaolin (ignition loss: 14.6%), 587 g of pseudo-boehmite, 222 g of silica, and 2.0 L of water were mixed and slurried. 50 mL of hydrochloric acid was added and stirred for 0.5 hour. Then the molecular sieve slurry Z-6J was added and stirred for 25 minutes, then 870 g of aluminum sol (containing 19.4 wt % of alumina) was added and the stirring was continued for 30 minutes to form a gel. After homogenization, spray-drying and molding, calcining, washing with water and drying were carried out to obtain the catalyst C-6 of the present invention.

Comparative Example 2

(1) 16 g of citric acid, 4 g of ethylene glycol, 54 g of yttrium nitrate and 1 L of deionized water were mixed and stirred for 15 minutes to form a yttrium-containing solution.

(2) The yttrium-containing solution obtained in step (1) was added to the synthesized yttrium-containing Y-type molecular sieve slurry Y-1, and stirred at a temperature of 55° C. for 10 minutes. The resultant was filtered, washed with water, and the filter cake was calcined at 600° C. under 100% steam atmosphere for 2 hours to obtain the comparative molecular sieve DZ-1.

600 g (on dry basis) of molecular sieve DZ-1 was added to 1.2 L of deionized water, and the molecular sieve slurry DZ-1J was obtained after sand milling. 619 g of aluminum sol (containing 19.4 wt % of alumina), 1499 g of kaolin (ignition loss: 14.6%), and 2.2 L of water were mixed and slurried. Then the molecular sieve slurry DZ-1J was added and stirred for 30 minutes. After homogenization, spray-drying and molding, calcining, washing with water and drying were carried out to obtain the comparative catalyst DC-1 containing the comparative molecular sieve DZ-1.

Comparative Example 3

(1) 54 g of yttrium nitrate and 1 L of deionized water were mixed to form a homogeneous solution, then 100 g of ammonium oxalate was added therein and stirred for 15 minutes to form a yttrium-containing precipitate slurry.

(2) The precipitate slurry formed in step (1) was added to the synthesized yttrium-containing Y-type molecular sieve slurry Y-1, and stirred at a temperature of 55° C. for 10 minutes. The resultant was filtered, washed, and the filter cake was calcined at 600° C. under 100% steam atmosphere for 2 hours to obtain the comparative molecular sieve DZ-2.

600 g (on dry basis) of molecular sieve DZ-2 was added to 1.2 L of deionized water, the molecular sieve slurry DZ-2J was obtained after sand milling. 619 g of aluminum sol (containing 19.4 wt % of alumina), 1499 g of kaolin (ignition loss: 14.6%), and 2.2 L of water were mixed and slurried. Then the molecular sieve slurry DZ-2J was added and stirred for 30 minutes. After homogenization, spray-drying and molding, calcining, washing with water and drying were carried out to obtain the comparative catalyst DC-2 containing the comparative molecular sieve DZ-2.

Comparative Example 4

The synthesized yttrium-containing Y-type molecular sieve slurry Y-1 was stirred at a temperature of 55° C. for 10 minutes. The resultant was filtered, washed with water, and the filter cake was calcined at 600° C. under 100% steam atmosphere for 2 hours to obtain the comparative molecular sieve DZ-3.

600 g (on dry basis) of molecular sieve DZ-3 was added to 1.2 L of deionized water, and the molecular sieve slurry DZ-3J was obtained after sand milling. 619 g of aluminum sol (containing 19.4 wt % of alumina), 1499 g of kaolin (ignition loss: 14.6%), and 2.2 L of water were mixed and slurried. Then the molecular sieve slurry DZ-3J was added and stirred for 30 minutes. After homogenization, spray-drying and molding, calcining, washing with water and drying were carried out to obtain the comparative catalyst DC-3 containing the comparative molecular sieve DZ-3.

Comparative Example 5

According to the preparation method of a molecular sieve containing rare earth disclosed by Chinese patent CN99105792.9: 798 g (on dry basis) of REUSY molecular sieve, 16 g (on dry basis) of ZSM-5 molecular sieve and water were mixed and slurried according to the weight ratio of molecular sieve (on dry basis): water=1:3 to form a molecular sieve slurry, 110 g of ethylenediamine tetraacetic acid was added, and the pH value of the molecular sieve slurry was adjusted with aqueous ammonia to be in the range of 7.5 to 8.0. And 23 g of ethanol was added therein, and stirred at room temperature (25° C.) for 45 minutes. The resultant was filtered, washed, and the filter cake was dried at 200° C. to obtain the comparative molecular sieve DZ-4.

600 g (on dry basis) of molecular sieve DZ-4 was added to 1.2 L of deionized water, and the molecular sieve slurry DZ-4J as obtained after sand milling. 619 g aluminum sol (containing 19.4 wt % of alumina), 1513 g of diatomaceous earth, and 2.2 L of water were mixed and slurried. Then the molecular sieve slurry DZ-4J was added and stirred for 30 minutes. After homogenization, spray-drying and molding, calcining, washing with water and drying were carried out to obtain the comparative catalyst DC-4 containing the comparative molecular sieve DZ-4.

Comparative Example 6

(1) 798 g (on dry basis) of REUSY molecular sieve and water were mixed according to the weight ratio of molecular sieve (on dry basis): water=1:3 to form a molecular sieve slurry.

(2) 85 g of lanthanum nitrate was added into 0.8 L of deionized water and stirred, the pH value of the molecular sieve slurry was adjusted with aqueous ammonia to be in the range of 6.5 to 7.0, and the stirring was continued at room temperature (25° C.) for 1.5 hours to form a rare earth-containing precipitate slurry.

(3) The precipitate slurry formed in step (2) was added to the molecular sieve slurry obtained in step (1), and stirred at room temperature (25° C.) for 15 minutes. The mixed slurry was dried at 250° C. to obtain the comparative molecular sieve DZ-5.

600 g (on dry basis) of molecular sieve DZ-5 was added to 1.2 L of deionized water, and the molecular sieve slurry DZ-5J was obtained after sand milling. 1054 g of kaolin (ignition loss: 14.6%), 587 g of pseudo-boehmite, and 2.2 L of water were mixed and slurried. 60 mL of hydrochloric acid was added and stirred for 1 hour. Then the molecular sieve slurry DZ-5J was added and stirred for 15 minutes. 515 g of aluminum sol (containing 19.4 wt % of alumina) was added and stirring was continued for 30 minutes to form a gel. After homogenization, spray-drying and molding, calcining, washing with water and drying were carried out to obtain the comparative catalyst DC-5 containing the comparative molecular sieve DZ-5.

Comparative Example 7

798 g (on dry basis) of NH$_4$Y molecular sieve were mixed with water according to the weight ratio of molecular sieve (on dry basis): water=1:5 and form a slurry. 0.6 L of deionized water was added therein and the resultant was stirred at a temperature of 35° C. for 70 minutes to obtain the comparative molecular sieve DZ-6 slurry. The comparative molecular sieve DZ-6 slurry was spray-dried to obtain the comparative molecular sieve DZ-6.

1030 g of kaolin (ignition loss: 14.6%), 440 g of pseudo-boehmite, 120 g of boehmite, and 2.2 L of water were mixed and slurried. 33 mL of hydrochloric acid was added and stirred for 1 hour. Then 600 g (on dry basis) of the molecular sieve DZ-6 slurry was added and stirred for 15 minutes. 619 g of aluminum sol (containing 19.4 wt % of alumina) was added and the stirring was continued for 30 minutes to form a gel. After homogenization, spray-drying and molding, calcining, washing with water and drying were carried out to obtain the comparative catalyst DC-6 containing the comparative molecular sieve DZ-6.

Comparative Example 8

(1) 798 g (on dry basis) of NH$_4$Y molecular sieve were mixed with water according to the weight ratio of molecular sieve (on dry basis): water=1:3.5 to form a slurry.

(2) 70 g of diammonium phosphate, 64 g of cerium nitrate were added to 0.4 L of deionized water and stirred at a temperature of 15° C. for 30 minutes to form a rare earth-containing precipitate slurry.

(3) The precipitate slurry formed in step (2) was added to the molecular sieve slurry obtained in step (1), and stirred at a temperature of 15° C. for 25 minutes. The resultant was spray-dried, and the obtained molecular sieve was hydrothermally calcined in a calcination furnace under 100% steam atmosphere at a temperature of 550° C. for a calcination time of 2.5 hours to obtain the comparative molecular sieve DZ-7.

600 g (on dry basis) of molecular sieve DZ-7 was added to 1.2 L of deionized water, after sanding treatment to obtain the molecular sieve slurry DZ-7J. 738 g of kaolin (ignition loss: 14.6%), 220 g of pseudo-boehmite, 1.5 L of water were mixed and slurried. 19 mL of hydrochloric acid was added and stirred for 1 hour. Then the molecular sieve slurry DZ-7J was added and stirred for 25 minutes, then 619 g of aluminum sol (containing 19.4 wt % of alumina) was added and the stirring was continued for 30 minutes to form a gel. After homogenization, spray-drying and molding, calcining, washing with water and drying were carried out to obtain the comparative catalyst DC-7 containing the comparative molecular sieve DZ-7.

Comparative Example 9

According to a method for increasing rare earth content of the ultrastable Y-type zeolite disclosed in Chinese patent CN200510114495.1, 798 g (on dry basis) of NH$_4$Y molecular sieve was calcined under 100% steam atmosphere at 600° C. for 1.5 hours to obtain an ultrastable Y molecular sieve. The ultrastable Y molecular sieve were mixed with water according to the weight ratio of molecular sieve (on dry basis): water=1:5 to form a slurry, 40 g of ammonium citrate was added therein and stirred at 35° C. for 1 hour, then the resultant was washed, filtered and the filter cake was removed. The filter cake was mixed according to the weight ratio of molecular sieve (on dry basis):water=1:5, stirred and then added with 277 mL of rare earth nitrate. And the stirring was continued for 1 hour at 35° C., and the resultant was filtered and dried to obtain the comparative molecular sieve DZ-8.

600 g (on dry basis) of molecular sieve DZ-8 was added to 1.5 L of deionized water, and the molecular sieve slurry DZ-8J was obtained after sand milling. 1030 g of kaolin (ignition loss: 14.6%), 440 g of pseudo-boehmite, 120 g of boehmite, and 2.2 L of water were mixed and slurried. 50 mL of hydrochloric acid was added and stirred for 1 hour. Then the molecular sieve slurry DZ-8J was added and stirred for 15 minutes, then 619 g of aluminum sol (containing 19.4 wt % of alumina) was added and the stirring was continued for 30 minutes to form a gel. After homogenization, spray-drying and molding, calcining, washing with water and drying were carried out to obtain the comparative catalyst DC-8 containing the comparative molecular sieve DZ-8.

Comparative Example 10

According to a method for preparing a novel rare earth ultrastable Y molecular sieve containing a vanadium-resistant component for catalytic cracking of heavy oil disclosed by Chinese Patent No. CN02103909.7, 798 g (on dry basis) of $NH_4Y$ molecular sieve were mixed with water according to the weight ratio of molecular sieve (on dry basis): water=1:5 to form a slurry, 64 g of ammonium oxalate was added and stirred at a temperature of 25° C. for 0.5 hour. Then 69.2 mL of rare earth nitrate was added and further stirred sufficiently for 15 minutes. The resultant was filtered and washed with water, and the obtained molecular sieve was hydrothermally calcined in a calcination furnace under 100% steam atmosphere at a temperature of 650° C. for a calcination time of 2 hours to obtain the comparative molecular sieve DZ-9.

500 g (on dry basis) of molecular sieve DZ-9 was added to 1.0 L of deionized water, and the molecular sieve slurry DZ-9J was obtained after sand milling. 867 g of kaolin (ignition loss: 14.6%), 587 g of pseudo-boehmite, 222 g of silica, and 2.0 L of water were mixed and slurried. 50 mL of hydrochloric acid was added and stirred for 0.5 hour. Then the molecular sieve slurry DZ-9J was added and stirred for 25 minutes, then 870 g of aluminum sol (containing 19.4 wt % of alumina) was added and the stirring was continued for 30 minutes to form a gel. After homogenization, spray-drying and molding, calcining, washing with water and drying were carried out to obtain the comparative catalyst DC-9 containing the comparative molecular sieve DZ-9.

Physical and chemical properties of the molecular sieves Z-1 to Z-6 prepared in Examples 3 to 8 and the molecular sieves DZ-1 to DZ-9 prepared in Comparative Examples 2 to 10 were analyzed and tested. The results obtained are shown in Table 2:

TABLE 2

Properties of the modified molecular sieves

| Items | Sodium oxide wt % | Yttrium oxide wt % | Rare earth oxide wt % | Crystallinity wt % | Unit cell constant nm |
|---|---|---|---|---|---|
| The molecular sieve Z-1 prepared by Example 3 | 1.56 | 5.81 | — | 68 | 2.455 |
| The molecular sieve Z-2 prepared by Example 4 | 1.20 | — | 7.06 | 48 | 2.458 |
| The molecular sieve Z-3 prepared by Example 5 | 1.24 | — | 8.00 | 45 | 2.456 |
| The molecular sieve Z-4 prepared by Example 6 | 1.53 | — | 7.98 | 44 | 2.454 |
| The molecular sieve Z-5 prepared by Example 7 | 1.52 | — | 3.06 | 52 | 2.452 |
| The molecular sieve Z-6 prepared by Example 8 | 1.59 | — | 1.99 | 56 | 2.450 |
| The molecular sieve DZ-1 prepared by Comparative Example 2 | 1.48 | 4.31 | — | 66 | 2.453 |
| The molecular sieve DZ-2 prepared by Comparative Example 3 | 1.44 | 5.79 | — | 68 | 2.457 |
| The molecular sieve DZ-3 prepared by Comparative Example 4 | 1.51 | 2.66 | — | 66 | 2.451 |
| The molecular sieve DZ-4 prepared by Comparative Example 5 | 1.18 | — | 4.02 | 50 | 2.456 |
| The molecular sieve DZ-5 prepared by Comparative Example 6 | 1.20 | — | 7.96 | 44 | 2.456 |
| The molecular sieve DZ-6 prepared by Comparative Example 7 | 1.64 | — | — | 53 | 2.453 |
| The molecular sieve DZ-7 prepared by Comparative Example 8 | 1.51 | — | 2.98 | 52 | 2.452 |
| The molecular sieve DZ-8 prepared by Comparative Example 9 | 1.32 | — | 6.40 | 44 | 2.456 |
| The molecular sieve DZ-9 prepared by Comparative Example 10 | 1.48 | — | 1.81 | 54 | 2.450 |

The results in Table 2 show that, as compared with the molecular sieve DZ-1 prepared by Comparative Example 2, the sodium oxide content, degree of crystallinity, and unit cell constant of the molecular sieve Z-1 prepared by Example 3 are comparable to the comparative molecular sieve DZ-1, but the yttrium oxide content of the molecular sieve is higher than DZ-1 (1.50 wt % higher), indicating that the precipitating agent is indispensable in the preparation process of the molecular sieve of the present invention, which facilitates the precipitation of Group IIIB elements of the periodic table on the molecular sieve. In comparison with the molecular sieve Z-4 prepared by Example 6, the molecular sieve DZ-8 prepared by Comparative Example 9 has a low rare earth content in the molecular sieve and a low utilization of rare earth, since the filtration is carried out after the rare earth ion exchange, and there is a phenomenon that the rare earth that has not been exchanged to the molecular sieve is lost to the filtrate. The rare earth contained in the comparative molecular sieve DZ-8 enters the molecular sieve through ion exchange. These rare earth render the unit cells of the molecular sieve not easy to shrink in the hydrothermal calcination process, so its unit cell constant is higher than that of the molecular sieve Z-4 prepared by Example 6. In addition, in comparison with the molecular sieve Z-4 prepared by Example 6, the molecular sieve DZ-8 prepared by Comparative Example 9 involves the filtration treatment process of the molecular sieve, and the preparation process is relatively complicated. In comparison with the molecular sieve Z-6 prepared by Example 8, the molecular sieve DZ-9 prepared by Comparative Example 10 is also problematic in that the rare earth is lost and the molecular sieve preparation process is relatively complicated, due to the filtration after addition of rare earth to the molecular sieve. In the process of preparing molecular sieve Z-6 by Example 8, ammonium oxalate is mainly used as the precipitating agent for rare earth, but in the process of preparing molecular sieve DZ-9 by Comparative Example 10, ammonium oxalate firstly acts as a dealuminating agent to remove aluminum on the molecular sieve, and then reacts with the rare earth to precipitate the rare earth.

In order to investigate the cracking activity and hydrothermal stability of the molecular sieves, the molecular sieves Z-1 to Z-6 prepared by Examples 3 to 8 and molecular sieves DZ-1 to DZ-9 prepared by Comparative Examples 2 to 10 were respectively used, 5% (in terms of alumina) of aluminum sol (containing 21.2 wt % of alumina) binder, 30% of the molecular sieve (on dry basis), 65% of kaolin (ignition loss: 18.6%, on dry basis) and a suitable amount of deionized water were mixed evenly, homogenized, dried, crushed and sieved. 20 to 40 mesh particles were selected to test the activity of the catalyst after 17 hours of steam aging respectively. The test results are shown in Table 3.

In order to investigate the heavy metal contamination resistance ability of the molecular sieves, the above 20 to 40 mesh particles were impregnated with 5000 µg/g of V, and 3000 µg/g of Ni (relative to the catalyst particles) by incipient-wetness impregnation method. The vanadium and nickel-contaminated particles were treated under the condition of 800° C. and 100% of steam for 6h. The activity of vanadium and nickel-contaminated catalyst after 6 h steam aging was tested. The test results are shown in Table 3.

In Table 3, the activity preservation rate R1 is used to characterize the ability of heavy metal contamination resistance of the molecular sieve. Definition: activity preservation rate R1=activity after vanadium and nickel contamination and 6 h steam aging/activity after 17 h steam aging× 100%.

TABLE 3

The activity and heavy metal resistance properties of the catalysts prepared by the modified molecular sieves

| Items | Activity after 17 h steam aging, wt % | Activity against vanadium and nickel contamination after 6 h steam aging, wt % | activity preservation rate R1, wt % |
|---|---|---|---|
| Catalyst containing the molecular sieve Z-1 prepared by Example 3 | 68 | 57 | 84 |
| Catalyst containing the molecular sieve Z-2 prepared by Example 4 | 60 | 51 | 85 |
| Catalyst containing the molecular sieve Z-3 prepared by Example 5 | 63 | 52 | 82 |
| Catalyst containing the molecular sieve Z-4 prepared by Example 6 | 58 | 51 | 88 |
| Catalyst containing the molecular sieve Z-5 prepared by Example 7 | 48 | 39 | 81 |
| Catalyst containing the molecular sieve Z-6 prepared by Example 8 | 44 | 38 | 86 |
| Catalyst containing the molecular sieve DZ-1 prepared by Comparative Example 2 | 64 | 45 | 70 |
| Catalyst containing the molecular sieve DZ-2 prepared by Comparative Example 3 | 67 | 51 | 76 |
| Catalyst containing the molecular sieve DZ-3 prepared by Comparative Example 4 | 58 | 41 | 71 |
| Catalyst containing the molecular sieve DZ-4 prepared by Comparative Example 5 | 51 | 35 | 69 |
| Catalyst containing the molecular sieve DZ-5 prepared by Comparative Example 6 | 62 | 45 | 72 |
| Catalyst containing the molecular sieve DZ-6 prepared by Comparative Example 7 | 38 | 27 | 71 |
| Catalyst containing the molecular sieve DZ-7 prepared by Comparative Example 8 | 49 | 36 | 73 |
| Catalyst containing the molecular sieve DZ-8 prepared by Comparative Example 9 | 60 | 47 | 78 |
| Catalyst containing the molecular sieve DZ-9 prepared by Comparative Example 10 | 44 | 34 | 77 |

The results in Table 3 show that in comparison with the molecular sieve DZ-1 to DZ-9 prepared by Comparative Examples 2 to 10, for the catalysts prepared using the molecular sieves Z-1 to Z-6 prepared by Examples 3 to 8 of the present invention as the active component all have improved activity preservation rate R1, indicating that the modified molecular sieve of the present invention has a stronger vanadium and nickel contamination resistance.

In comparison with the molecular sieve DZ-1 prepared by Comparative Example 2, the catalyst prepared by using the molecular sieve Z-1 prepared by Example 3 of the present invention as an active component has a significantly higher (by 4%) 17h activity than the comparative catalyst containing the molecular sieve prepared in Comparative Example 2. After the catalyst was contaminated by vanadium and nickel, the catalyst prepared by using the molecular sieve Z-1 prepared by Example 3 of the present invention as an active component has the activity after vanadium and nickel contamination and 6h steam aging was significantly higher by 12% than the comparative catalyst (the catalyst containing the molecular sieve DZ-1 prepared by Comparative Example 2), the activity preservation rate R1 increased by 14%, indicating that the molecular sieve containing the precipitated yttrium of the present invention has a higher activity stability and resistance to vanadium, nickel contamination. In comparison with the molecular sieve DZ-2 prepared by Comparative Example 3, the catalyst prepared by using the molecular sieve Z-1 prepared by Example 3 of the present invention as the active component has the 17 h activity comparable to that of the comparative catalyst containing the molecular sieve prepared in Comparative Example 3, but when the catalyst was contaminated with vanadium and nickel, the catalyst prepared by using the molecular sieve Z-1 prepared by Example 3 of the present invention as an active component has the activity after vanadium and nickel-contamination and 6 h steam aging activity significantly higher by 6% than that of the comparative catalyst (the catalyst containing the molecular sieve DZ-2 prepared by Comparative Example 3) by 6%, the activity preservation rate R1 increased by 8%, indicating that the molecular sieve containing precipitated yttrium prepared by using the organic complexing agent and the dispersant of the present invention has a higher ability of resistance to vanadium and nickel contamination. In comparison with the molecular sieve DZ-3 prepared by Comparative Example 4, the catalyst prepared by using the molecular sieve Z-1 prepared by Example 3 of the present invention as an active component has a 17 hours activity significantly higher (by 10%) than that of the comparative catalyst containing the molecular sieve prepared by Comparative Example 4; when the catalysts were contaminated with vanadium and nickel, the catalyst prepared by using the molecular sieve Z-1 prepared by Example 3 of the present invention as an active component has a vanadium and nickel-contaminated 6h steam aging activity significantly higher (by 16%) than that of the comparative catalyst (the catalyst containing the molecular sieve DZ-3 prepared by Comparative Example 4), the activity preservation rate R1 increased by 13%, indicating that the molecular sieve containing precipitated yttrium of the present invention has higher activity stability and resistance to vanadium and nickel contamination.

In comparison with the molecular sieve DZ-4 prepared by Comparative Example 5, the catalyst prepared by using the molecular sieve Z-2 prepared by Example 4 of the present invention as an active component has a 17 hours activity significantly higher by 9% than that of the comparative catalyst containing the molecular sieve prepared by Comparative Example 5; after the catalysts were contaminated with vanadium and nickel, the catalyst prepared by using the molecular sieve Z-2 prepared by Example 4 of the present invention as an active component has the activity after vanadium and nickel contamination and 6h steam aging significantly higher by 16% than that of the comparative catalyst (the catalyst containing the molecular sieve DZ-4 prepared by Comparative Example 5), and the activity preservation rate R1 increased by 16%, indicating that the molecular sieve catalyst of the present invention containing the precipitated rare earth has higher activity stability and resistance to vanadium and nickel contamination.

In comparison with the molecular sieve DZ-5 prepared by Comparative Example 6, the catalyst prepared by using the molecular sieve Z-3 prepared by Example 5 of the present invention as an active component has the 17h activity higher by 1% than that of the comparative catalyst containing the molecular sieve prepared by Comparative Example 6; after the catalysts were contaminated with vanadium and nickel, the catalyst prepared by using the molecular sieve Z-3 prepared by Example 5 of the present invention as an active component has the activity after vanadium and nickel-contamination and 6h steam aging significantly higher by 7% than that of the comparative catalyst (the catalyst containing the molecular sieve DZ-5 prepared by Comparative Example 6), and the activity preservation rate R1 increased by 10%, indicating that the molecular sieve catalyst prepared by using the dispersant and urea and the aqueous ammonia precipitating agent has higher activity stability and resistance to vanadium and nickel contamination than the molecular sieve catalyst prepared by the precipitation technique using aqueous ammonia only.

In comparison with the molecular sieve DZ-6 prepared by Comparative Example 7, the catalyst prepared by using the molecular sieve Z-4 prepared by Example 6 of the present invention as an active component has a 17 h activity significantly higher by 20% than that of the comparative catalyst containing the molecular sieve prepared by Comparative Example 7; after the catalysts were contaminated with vanadium and nickel, the catalyst prepared by using the molecular sieve Z-4 prepared by Example 6 of the present invention as an active component has the activity after vanadium and nickel contamination and 6 h steam aging significantly higher by 24% than that of the comparative catalyst (the catalyst containing the molecular sieve DZ-6 prepared by Comparative Example 7), and the activity preservation rate R1 increased by 17%, indicating that the molecular sieve prepared by the present invention has higher activity stability and resistance to vanadium and nickel contamination than the molecular sieve without precipitated rare earth.

In comparison with the molecular sieve DZ-7 prepared by Comparative Example 8, the catalyst prepared by using the molecular sieve Z-5 prepared by Example 7 of the present invention as an active component has a 17 h activity comparable to that of the comparative catalyst containing the molecular sieve prepared by Comparative Example 8; after the catalysts were contaminated with vanadium and nickel, the catalyst prepared by using the molecular sieve Z-5 prepared by Example 7 of the present invention as an active component has the activity after vanadium and nickel contamination and 6 h steam aging higher by 3% than that of the comparative catalyst (the catalyst containing the molecular sieve DZ-7 prepared by Comparative Example 8), the activity preservation rate R1 increased by 8%, indicating that the molecular sieve prepared by using the dispersant of the present invention has higher activity stability and resistance to vanadium and nickel contamination than the molecular sieve prepared by the precipitation technique using rare earth phosphate without using dispersant.

In comparison with the molecular sieve DZ-8 prepared by Comparative Example 9, after the catalysts were contaminated with vanadium and nickel, the catalyst prepared by using the molecular sieve Z-4 prepared by Example 6 of the present invention as an active component has the activity after vanadium and nickel contamination and 6h steam aging significantly higher by 4% than that of the comparative catalyst (the catalyst containing the molecular sieve DZ-8 prepared by Comparative Example 9), and the activity preservation rate R1 increased by 10%, indicating that the molecular sieve prepared by the present invention has higher activity stability and resistance to vanadium and nickel contamination than the molecular sieve without precipitate of rare earth prepared by the method of Chinese patent CN200510114495.1 in the prior art.

In comparison with the molecular sieve DZ-9 prepared by Comparative Example 10, after the catalysts were contaminated with vanadium and nickel, the catalyst prepared by using the molecular sieve Z-6 by Example 8 of the present invention as an active component has the activity after vanadium and nickel contamination and 6 h steam aging significantly higher by 4% than that of the comparative catalyst (the catalyst containing the molecular sieve DZ-9 prepared by Comparative Example 10), and the activity preservation rate R1 increased by 9%, indicating that the molecular sieve prepared by using the complexing agent and dispersant of the present invention has higher activity stability and resistance to vanadium and nickel contamination than the molecular sieve prepared by the method of Chinese patent CN02103909.7 in the prior art.

In order to further investigate the cracking activity and the hydrothermal stability of the catalysts, the catalysts C-1 to C-6 prepared by Examples 3 to 8 and the comparative catalysts DC-1 to DC-9 prepared by Comparative Examples 2 to 10 were respectively tested for the activity of catalysts after 17 h steam aging. The test results are shown in Table 4.

In order to investigate the ability of heavy metal contamination resistance of the catalysts, the catalysts C-1 to C-6 and the comparative catalysts DC-1 to DC-9 were respectively impregnated with 5000 μg/g of V, and 3000 μg/g of Ni (relative to the catalysts) by incipient-wetness impregnation method. The vanadium and nickel-contaminated catalysts were treated under the condition of 800° C. and 100% of steam for 6h, and tested for the activity of vanadium and nickel-contaminated catalyst after 6h steam aging was tested. The test results are shown in Table 4:

TABLE 4

Activity and heavy metal resistance properties of the catalysts

| Items | 17 h water vapor aging aActivity after 17 h steam aging, wt % | vanadium and nickel-contaminated 6 h water vapor aging aActivity after vanadium and nickel contamination and 6 h steam aging, wt % | Activity preservation rate R1, wt % |
|---|---|---|---|
| catalyst C-1 prepared in Example 3 | 70 | 58 | 83 |
| catalyst C-2 prepared in Example 4 | 63 | 54 | 86 |
| catalyst C-3 prepared in Example 5 | 67 | 57 | 85 |
| catalyst C-4 prepared in Example 6 | 61 | 54 | 88 |
| catalyst C-5 prepared in Example 7 | 56 | 46 | 82 |
| catalyst C-6 prepared in Example 8 | 44 | 39 | 89 |
| comparative catalyst DC-1 prepared in Comparative Example 2 | 67 | 49 | 73 |
| comparative catalyst DC-2 prepared in Comparative Example 3 | 70 | 53 | 76 |
| comparative catalyst DC-3 prepared in Comparative Example 4 | 60 | 43 | 72 |
| comparative catalyst DC-4 prepared in Comparative Example 5 | 54 | 38 | 70 |
| comparative catalyst DC-5 prepared in Comparative Example 6 | 63 | 47 | 75 |
| comparative catalyst DC-6 prepared in Comparative Example 7 | 41 | 30 | 73 |
| comparative catalyst DC-7 prepared in Comparative Example 8 | 57 | 42 | 74 |
| comparative catalyst DC-8 prepared in Comparative Example 9 | 61 | 48 | 79 |
| comparative catalyst DC-9 prepared in Comparative Example 10 | 44 | 34 | 77 |

In Table 4, the activity preservation rate R1 is used to characterize the ability of heavy metal contamination resistance of the catalysts. Definition: activity preservation rate R1=activity after vanadium and nickel contamination and 6 h steam aging/activity after 17 h steam aging×100%.

The results in Table 4 show that in comparison with the molecular sieve DC-1 to DC-9 prepared by Comparative Examples 2 to 10, for the catalysts prepared using the molecular sieves C-1 to C-6 prepared by Examples 3 to 8 of the present invention all have improved activity preservation rate R1, indicating that the modified molecular sieve catalysts of the present invention has a higher resistance to vanadium and nickel contamination.

In comparison with the catalyst DC-1 prepared by Comparative Example 2, the catalyst C-1 prepared by Example 3 of the present invention has a 17 h activity significantly higher 3% than that of the comparative catalyst DC-1 prepared by Comparative Example 2; after the catalysts were contaminated with vanadium and nickel, the catalyst C-1 prepared by Example 3 has the activity after vanadium and nickel contamination and 6 h steam aging significantly higher by 9% than that of the comparative catalyst (DC-1), and the activity preservation rate R1 increased by 10%, indicating that catalyst containing precipitated yttrium of the present invention has higher activity stability and resistance to vanadium and nickel contamination. In comparison with the catalyst DC-2 prepared by Comparative Example 3, the catalyst C-1 prepared by Example 3 of the present invention has a 17h activity comparable with that of the comparative catalyst DC-2; after the catalysts were contaminated with vanadium and nickel, the catalyst C-1 prepared by Example 3 has the activity after vanadium and nickel contamination and 6 h steam aging significantly higher by 5% than that of the comparative catalyst (DC-2), and the activity preservation rate R1 increased by 7%, indicating that catalyst containing precipitated yttrium prepared with the organic complexing agent and dispersant of the present invention has higher activity stability and resistance to vanadium and nickel contamination. In comparison with the catalyst DC-3 prepared by Comparative Example 4, the catalyst C-1 prepared by Example 3 of the present invention has a 17 h activity significantly higher by 10% than that of the comparative catalyst DC-3; after the catalysts were contaminated with vanadium and nickel, the catalyst C-1 prepared by Example 3 of the present invention has the activity after vanadium and nickel contamination and 6 h steam aging significantly higher by 15% than that of the comparative catalyst (DC-3), and the activity preservation rate R1 increased by 11%, indicating that the catalyst containing precipitated yttrium of the present invention has higher activity stability and resistance to vanadium and nickel contamination.

In comparison with the catalyst DC-4 prepared by Comparative Example 5, the catalyst C-2 prepared by Example 4 of the present invention has a 17 h activity significantly higher by 9% than that of the comparative catalyst DC-4 prepared by Comparative Example 5; after the catalysts were contaminated with vanadium and nickel, the catalyst C-2 prepared by Example 4 of the present invention has the activity after vanadium and nickel contamination and 6 h steam aging significantly higher by 16% than that of the comparative catalyst (DC-4), and the activity preservation rate R1 increased by 16%, indicating that the catalyst containing the precipitated rare earth of the present invention has higher activity stability and resistance to vanadium and nickel contamination.

In comparison with the catalyst DC-5 prepared by Comparative Example 6, the catalyst C-3 prepared by Example 5 of the present invention has a 17 h activity higher than that of the comparative catalyst DC-5 prepared by Comparative Example 6 by 4%; after the catalysts were contaminated with vanadium and nickel, the catalyst C-3 prepared by Example 5 of the present invention has the activity after vanadium and nickel contamination and 6 h steam aging significantly higher by 10% than that of the comparative catalyst (DC-5), and the activity preservation rate R1 increased by 10%, indicating that the catalyst prepared by using the dispersant and urea and the aqueous ammonia precipitating agent of the present invention has higher activity stability and resistance to vanadium and nickel contamination than the catalyst prepared by the precipitation technique using aqueous ammonia only.

In comparison with the catalyst DC-6 prepared by Comparative Example 7, the catalyst C-4 prepared by Example 6 of the present invention has a 17 h activity significantly higher by 20% than that of the comparative catalyst DC-6 prepared by Comparative Example 7; after the catalysts were contaminated with vanadium and nickel, the catalyst C-4 prepared by Example 6 of the present invention has the activity after vanadium and nickel contamination and 6 h steam aging significantly higher by 24% than that of the comparative catalyst (DC-6), and the activity preservation rate R1 increased by 15%, indicating that the catalyst prepared by the present invention has higher activity stability and resistance to vanadium and nickel contamination than the catalyst without precipitated rare earth.

In comparison with the catalyst DC-7 prepared by Comparative Example 8, activity of the catalyst C-5 prepared by Example 7 of the present invention has a 17 h activity comparable with that of the comparative catalyst DC-7; after the catalysts were contaminated with vanadium and nickel, the catalyst C-5 prepared by Example 7 of the present invention has the activity after vanadium and nickel contamination and 6 h steam aging significantly higher by 4% than that of the comparative catalyst (DC-7), and the activity preservation rate R1 increased by 8%, indicating that the catalyst prepared by using the dispersant of the present invention has higher activity stability and resistance to vanadium and nickel contamination than the catalyst prepared by the precipitation technique using rare earth phosphate without dispersant.

In comparison with the catalyst DC-8 prepared by Comparative Example 9, after the catalysts were contaminated with vanadium and nickel, the catalyst C-4 prepared by Example 6 of the present invention has an activity after vanadium and nickel contamination and 6 h steam aging significantly higher by 6% than that of the comparative catalyst (DC-8), and the activity preservation rate R1 increased by 9%, indicating that the catalyst prepared by the present invention has higher activity stability and resistance to vanadium and nickel contamination than the catalyst without precipitated rare earth prepared by the method of Chinese patent CN200510114495.1 in the prior art.

In comparison with the catalyst DC-9 prepared by Comparative Example 10, after the catalysts were contaminated with vanadium and nickel, the catalyst C-6 prepared by Example 8 of the present invention the activity after vanadium and nickel contamination and 6 h steam aging significantly higher by 5% than that of the comparative catalyst (DC-9), and the activity preservation rate R1 increased by 12%, indicating that the catalyst prepared by using the complexing agent and dispersant of the present invention has higher activity stability and resistance to vanadium and nickel contamination than the catalyst prepared by the method of Chinese patent CN02103909.7 in the prior art.

The present invention certainly may have various other Examples. Various corresponding changes and modifications may be made by those skilled in the art according to the present invention without departing from the spirit and essence of the present invention. However, these corresponding changes and modifications should fall within the protection scope of the claims of the present invention.

The invention claimed is:

1. A method for modifying a molecular sieve, wherein the method comprises: mixing and stirring a solution containing metal ions of Group IIIB of the periodic table with an organic complexing agent and/or a dispersant and a precipitating agent to form a suspension containing a precipitate of Group IIIB element; mixing the suspension containing the precipitate of Group IIIB element with a molecular sieve slurry to obtain a mixed slurry containing the precipitate of Group IIIB element and the molecular sieve; spray-drying and optionally calcining the mixed slurry, to obtain the molecular sieve modified with the Group IIIB element;

wherein the weight ratio of the Group IIIB element in terms of oxide to the molecular sieve on dry basis is 0.3 to 10:100, the molar ratio of the organic complexing agent to the metal ions of Group IIIB is 0.3 to 10:1, and the molar ratio of the dispersant to the metal ions is 0.2 to 16:1.

2. The method for modifying according to claim 1, wherein the method comprises: mixing a solution containing the metal ions of Group IIIB of the periodic table with an organic complexing agent and/or a dispersant and a precipitating agent, and stirring this mixture for at least 10 minutes to form a suspension containing a precipitate of Group IIIB element; and mixing the suspension of the precipitate of Group IIIB element with a molecular sieve slurry and stirring this mixture at a temperature of 5 to 100° C. for at least 10 minutes to obtain a mixed slurry containing the precipitate of Group IIIB element and the molecular sieve; spray-drying and optionally calcining the mixed slurry, to obtain the molecular sieve modified with the Group IIIB element;
   wherein the weight ratio of the Group IIIB element in terms of oxide to the molecular sieve on dry basis is 0.3 to 10:100, the molar ratio of the organic complexing agent to the metal ions of Group IIIB is 0.3 to 10:1, and the molar ratio of the dispersant to the metal ions of Group IIIB is 0.2 to 16:1.

3. The method for modifying according to claim 2, wherein the mixed slurry containing the precipitate of Group IIIB element and the molecular sieve is obtained by stirring at a temperature of 5-60° C. for 10-40 minutes.

4. The method for modifying according to claim 2, wherein the weight ratio of the Group IIIB element in terms of oxide to the molecular sieve on dry basis is 0.3 to 8:100.

5. The method for modifying according to claim 2, wherein the molar ratio of the organic complexing agent to the metal ions of Group IIIB is 0.5 to 6:1; and the molar ratio of the dispersant to the metal ions of Group IIIB is 1 to 11:1.

6. The method for modifying according to claim 5, wherein the molar ratio of the organic complexing agent to the metal ions of Group IIIB is 1.0 to 4:1; and the molar ratio of the dispersant to the metal ions of Group IIIB is 2 to 7:1.

7. The method for modifying according to claim 2, wherein the precipitating agent is a substance capable of chemically reacting with the Group IIIB metal ion in the system and making the product thereof slightly soluble or insoluble in the system, in a chemical precipitation reaction.

8. The method for modifying according to claim 7, wherein the precipitating agent is one or more of oxalic acid, ammonium oxalate, ammonium carbonate, ammonium bicarbonate, carbon dioxide, aqueous ammonia, phosphoric acid, diammonium hydrogen phosphate, ammonium dihydrogen phosphate, ammonium phosphate and urea.

9. The method for modifying according to claim 2, wherein the organic complexing agent is selected from one or more of formic acid, acetic acid, adipic acid, citric acid, tartaric acid, benzoic acid, ethylenediamine tetraacetic acid, salicylic acid and salts of the above acids, and acetylacetone, diethanolamine, and triethanolamine.

10. The method for modifying according to claim 2, wherein the dispersant is a surfactant having both lipophilic and hydrophilic properties in the molecule, which can uniformly disperse those solid particles that are insoluble in liquid while preventing the sedimentation and agglomeration of the solid particles, and form a material needed for stabilizing the suspension, and the dispersant does not form precipitates with the metal ions of Group IIIB.

11. The method for modifying according to claim 10, wherein the dispersant is selected from one or more of monohydric or dihydric alcohols having 2 to 8 carbon atoms, polyethylene glycol, cellulose derivatives, polyacrylamide and derivatives thereof, and guar gum.

12. The method for modifying according to claim 11, wherein the cellulose derivative is selected from one or more of carboxymethylcellulose sodium, methyl hydroxyethyl cellulose, and hydroxy propyl methyl cellulose; and the monohydric or dihydric alcohol having 2 to 8 carbon atoms is selected from one or more of ethanol, ethylene glycol, isopropanol, butanol, and methylpentanol.

13. The method for modifying according to claim 2, wherein the Group IIIB element is selected from one or more of scandium, yttrium, and lanthanide rare earth elements.

14. The method for modifying according to claim 2, wherein the mixing process of the solution containing the metal ions of Group IIIB of the periodic table with the organic complexing agent and/or the dispersant, the precipitating agent is implemented through one of the following manners:
   Method 1: Uniformly mixing the solution containing the metal ions of Group IIIB of the periodic table with the organic complexing agent and/or the dispersant, followed by adding the precipitating agent and stirring for at least 10 minutes to form the precipitate containing Group IIIB element;
   Method 2: Uniformly mixing the precipitating agent with the organic complexing agent and/or the dispersant, followed by adding the compound solution containing the metal ions of Group IIIB of the periodic table and stirring for at least 10 minutes to form the precipitate containing Group IIIB element;
   Method 3: Mixing the precipitating agent with the compound solution containing the metal ions of Group IIIB of the periodic table, followed by adding the organic complexing agent and/or the dispersant and stirring for at least 10 minutes to form the precipitate containing Group IIIB element; or
   Method 4: Adding and mixing the solution containing the metal ions of Group IIIB of the periodic table and the organic complexing agent and/or the dispersant, the precipitating agent simultaneously, and stirring for at least 10 minutes to form the precipitate containing Group IIIB element.

15. A catalytic cracking catalyst containing a modified molecular sieve, wherein the catalyst contains a catalytically effective amount of the modified molecular sieve prepared by the method according to claim 2.

16. The catalytic cracking catalyst containing the modified molecular sieve according to claim 15, wherein the catalyst contains 10 to 55% on dry basis of the modified molecular sieve, 10 to 80% on dry basis of clay, 0 to 40% of an inorganic oxide in terms of oxide and 5 to 40% of a binder in terms of oxide, based on 100% of mass of the catalyst.

17. The catalytic cracking catalyst containing the modified molecular sieve according to claim 16, wherein the catalyst contains 15 to 45% on dry basis of the modified molecular sieve, 20 to 65% on dry basis of clay, 5 to 25% of the inorganic oxide in terms of oxide and 5 to 30% of the binder in terms of oxide, based on 100% of mass of the catalyst.

18. The method for modifying according to claim 2, wherein the molecular sieve slurry is a sodium-reduced molecular sieve slurry.

19. A method for preparing a catalytic cracking catalyst containing a modified molecular sieve, the method comprises:
   (1) mixing a solution containing the metal ions of Group IIIB of the periodic table with an organic complexing agent and/or a dispersant and a precipitating agent, and stirring this mixture for at least 10 minutes to form a suspension containing a precipitate of Group IIIB element and mixing the suspension of the precipitate of Group IIIB element with a molecular sieve slurry and stirring this mixture at a temperature of 5 to 100° C. for at least 10 minutes to obtain a mixed slurry containing the precipitate of Group IIIB element and the molecular sieve; and (2) mixing and slurrying the mixed slurry containing the precipitate of Group IIIB element and the molecular sieve obtained in (1), clay, an inorganic oxide and a binder, and spray-drying to prepare the catalyst.

20. The method according to claim 19, wherein the mixed slurry containing the precipitates of Group IIIB element and the molecular sieve is a mixed slurry containing the precipitate of Group IIIB element and a sodium-reduced molecular sieve.

* * * * *